United States Patent [19]
Ooley

[11] Patent Number: 5,878,828
[45] Date of Patent: Mar. 9, 1999

[54] VEHICLE MOUNTING SYSTEM

[76] Inventor: Kevin Ooley, 557 W. Keats Ave., Clovis, Calif. 93612

[21] Appl. No.: 951,142

[22] Filed: Oct. 15, 1997

[51] Int. Cl.[6] ........................................... B60K 7/00
[52] U.S. Cl. ........................... 180/55; 180/293; 180/299; 180/300; 180/312
[58] Field of Search ..................................... 180/293, 299, 180/300, 55, 312

[56] References Cited

U.S. PATENT DOCUMENTS

| | | | |
|---|---|---|---|
| 1,834,879 | 12/1931 | Trott . | |
| 1,941,763 | 1/1934 | Swennes | 248/14.2 |
| 1,975,810 | 10/1934 | Trott | 180/64 |
| 1,976,701 | 10/1934 | Trott | 180/64 |
| 2,013,599 | 9/1935 | Butler | 180/57 |
| 2,081,965 | 6/1937 | Trott | 180/55 |
| 4,108,267 | 8/1978 | Valerio | 180/71 |
| 5,577,571 | 11/1996 | Rizzoli | 180/299 |

*Primary Examiner*—J. J. Swann
*Assistant Examiner*—David R. Dunn
*Attorney, Agent, or Firm*—Oppenheimer Wolff & Donnelly LLP

[57] ABSTRACT

A vehicle mounting system is disclosed having a transfer arm coupled between the engine and the vehicle's rear axle for equalizing rear tire traction, control violent vibrations due to tire shake, improve drivability of the vehicle and safe control thereof The arm works by torque rotation of the engine at acceleration creating an upward force of the transfer arm at the area engine mount.

11 Claims, 3 Drawing Sheets

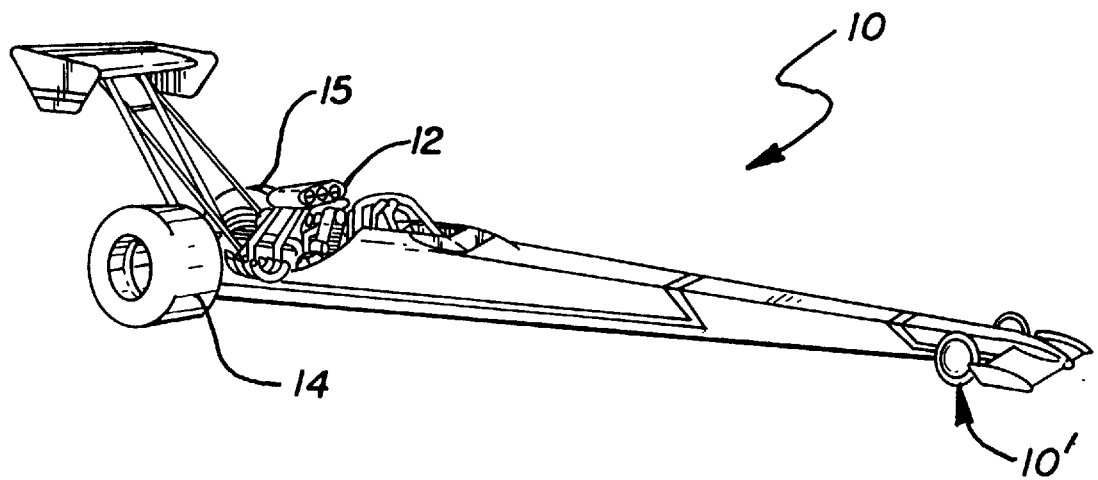
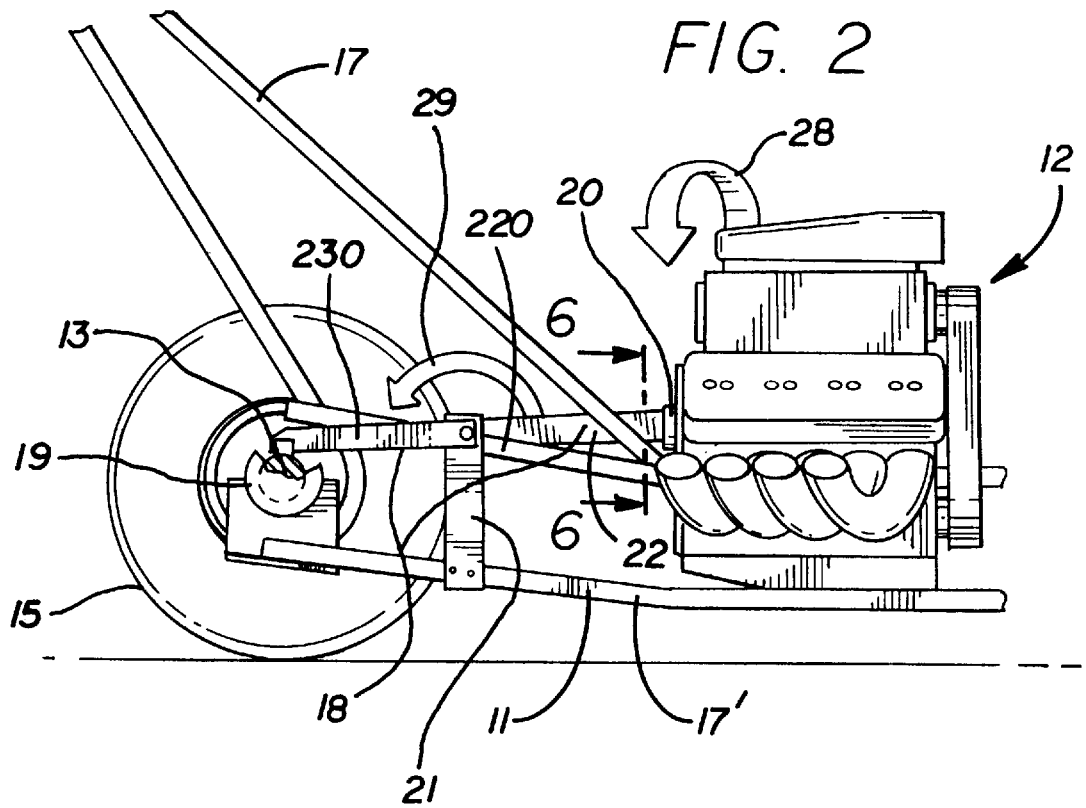

VEHICLE MOUNTING SYSTEM

BACKGROUND OF THE INVENTION

1. Field of the Invention

The invention relates to vehicle mounting systems; and, more particularly, to improved control of the vehicle during rapid acceleration.

2. Background Information

Control of a vehicle during rapid acceleration is desirable since violent vibrations due to tire shake and the like, such as encountered in drag racing, could result in serious accidents. There is thus a need for a vehicle mounting system wherein in cases of rapid acceleration, such as in drag racing, traction on the rear tires of the vehicle is equalized and violent vibrations are controlled improving the safety and drivability of the vehicle.

SUMMARY OF THE INVENTION

It is an object of this invention to improve the traction and controllability of a vehicle under rapid acceleration.

It is a further object of this invention to provide a transfer arm between the engine and rear axle of a vehicle to equalize the traction of the rear tires of the vehicle.

It is still another object of this invention to control the violent vibrations of a vehicle encountered in rapid acceleration thereof.

These and other objects are preferably accomplished by providing a vehicle mounting system having a transfer arm coupled between the engine and the vehicle's rear axle for equalizing rear tire traction, control violent vibrations due to tire shake, and improve drivability of the vehicle and safe control thereof The arm works by torque rotation of the engine at acceleration creating an upward force of the transfer arm at the rear engine mount. This changes to a downward force on the rear axle. The system is particularly suited for drag racing cars.

BRIEF DESCRIPTION OF THE DRAWING

FIG. 1 is a perspective view of a vehicle having rear axle control means mounted thereon in accordance with the teachings of the invention.

FIG. 2 is a view of a portion of the rear of the vehicle of FIG. 1;

DESCRIPTION OF THE PREFERRED EMBODIMENT

Figure 3:
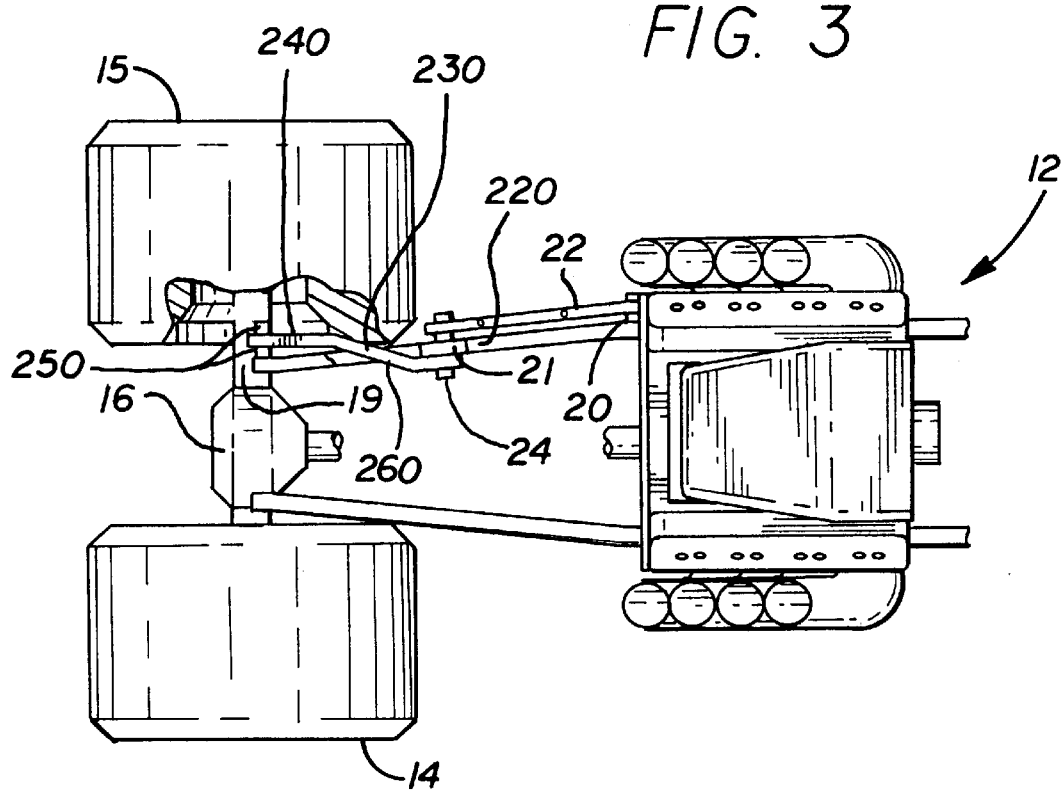
FIG. 3 is a top plan view of the vehicle of FIG. 2.

Referring now to FIG. 1 of the drawing, a vehicle 10 is shown having a chassis 11 (see FIG. 2) with a conventional engine 12 mounted thereon. Since the invention is particularly suited to drag racing vehicles, engine 12 may be such an engine having the usual engine components associated therewith.

Vehicle 10 has a rear axle 13 mounted to chassis 11 with tires 14, 15 (see also FIG. 3) mounted at each end thereof A front axle and wheel assembly 10' (FIG. 1) is also mounted on chassis 11. A conventional differential 16 (FIG. 3) is associated with engine 12 and axle 13 as is well known in the art.

Figure 6:
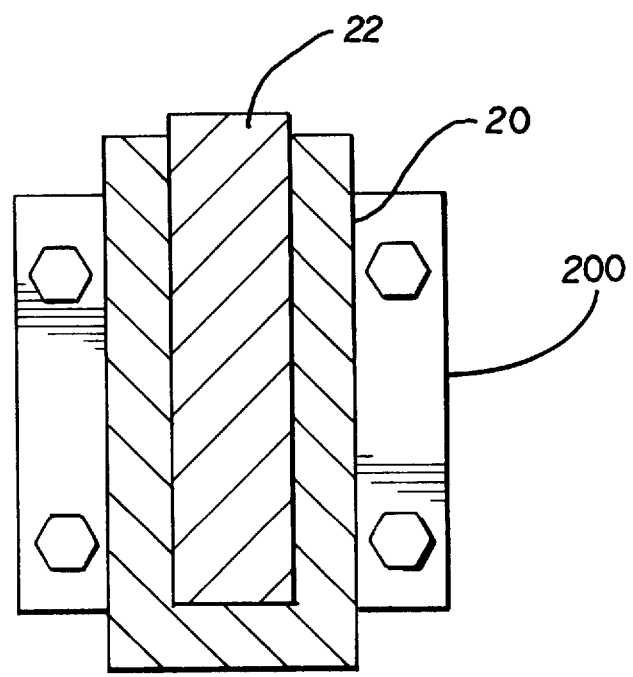
FIG. 6 is a view taken along lines 6—6 of FIG. 2.

As particularly contemplated in the present invention, rear axle control means 18 (FIG. 2) is provided between engine 12 and rear axle 13 to equalize rear tire traction and control violent vibrations due to tire shake thus improving drivability and control of the vehicle. Rear axle control means 18 thus includes a rear axle housing 19 coupled to rear axle 13 adjacent left tire 15, a mounting plate 20 (FIGS. 3 and 6) mounted to a flange plate 200 mounted on the rear of engine 12 also on the left side thereof and a chassis mount 21 (FIG. 2) mounted at bottom to lower chassis frame portion 17' and at top to upper chassis frame portion 220 (FIG. 3) about midway between engine 12 and axle 13. Rear axle control means 18 further includes a first transfer arm portion 22 coupled to engine mount 20 and a second transfer arm portion 230 having a first straight portion 240 (FIG. 3) coupled to an axle mount 250 mounted on axle housing 19 and an angled portion 260 pivotally connected via pivot pin 24 to both chassis mount 21 and first transfer arm portion 22. Also as seen in FIG. 2, chassis mount 21 may be an elongated rectangularly shaped flange of any suitable material, such as metal coupled between upper and lower chassis arms 17, 17'. First transfer arm portion 22, as heretofore discussed, is generally straight from engine mount 20 to chassis mount 21. Angled 260 angles from the chassis mount 21 to straight portion 240 connected to axle mount 250 on axle housing 19 as clearly seen in FIG. 3. Thus, arm portions 240, 260 may be at an angle of about 35° and first transfer arm portion, 22 may be about 3½ feet in overall length.

Transfer arm portions 22, 230, 260, and 240 thus comprise a transfer arm between the axle and the engine which may be made of any suitable material, such as multiple layers of leaves of steel.

Thus, the arm portions extends from the rear engine mounting plate 20 to the outermost top portion of the left rear axle housing 19. The pivot point 24 is located approximately midway between the points of connection of arm portion 22 to plate 20 and second transfer arm portion 230 to housing 19.

Figure 4:
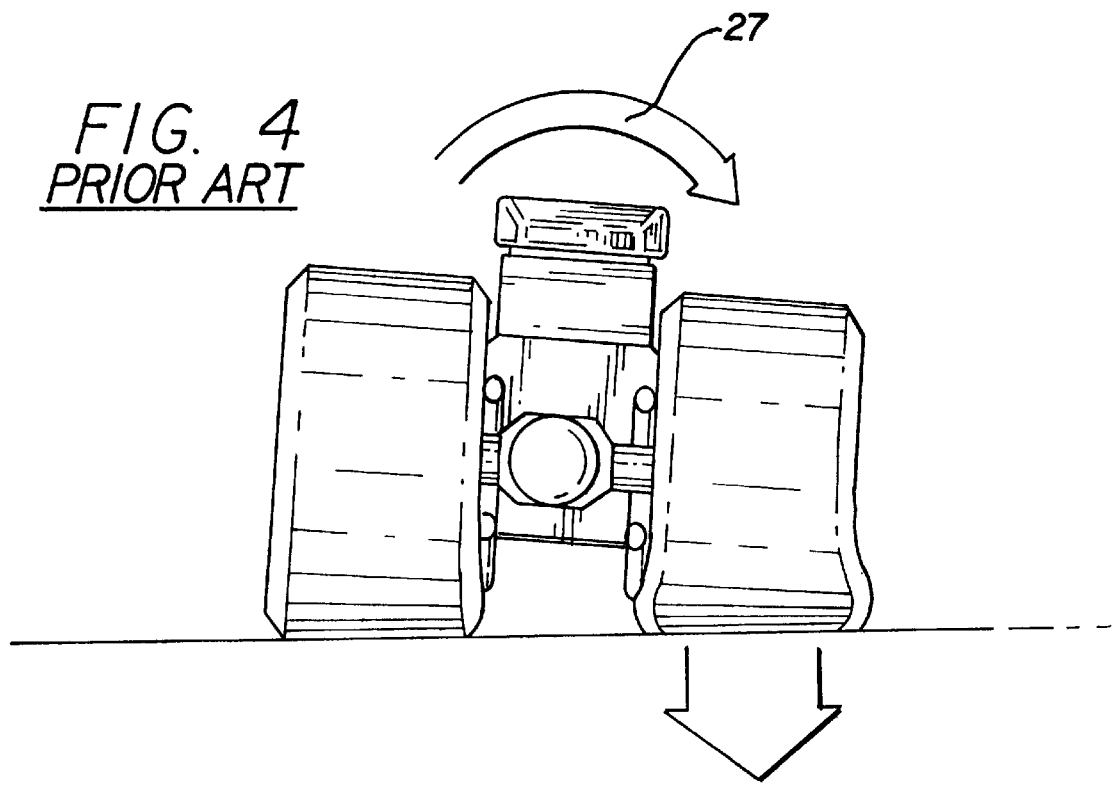
FIG. 4 is a rear view of a prior art vehicle similar to the vehicle of FIGS. 1 to 3 illustrating operation thereof without any rear axle control means.
Figure 5:
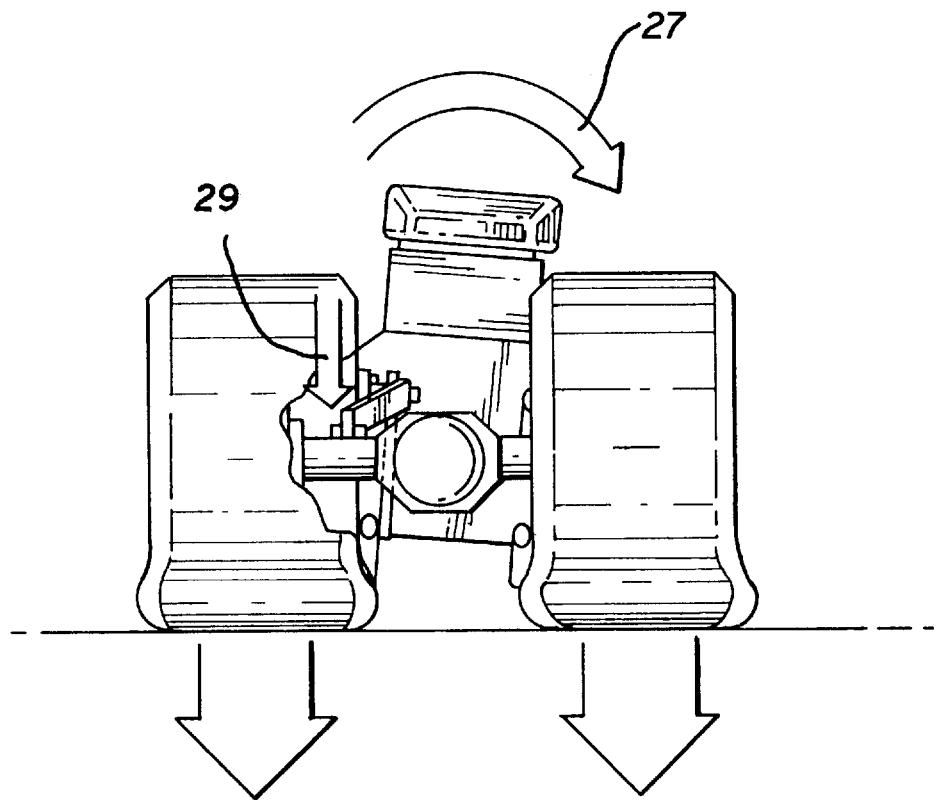
FIG. 5 is a view similar to FIG. 4 illustrating a further step in the operation thereof.

When a conventional engine similar to engine 12 is running at accelerated speed, torque rotation of the engine at acceleration, is indicated by arrows 27 in FIG. 4. However, with control means 18 installed, in upward force of the arm portion 22 is created at the rear engine mounting plate 20 as indicated by arrow 28 in FIG. 2. This then changes to a downward force on the outermost top portion of the left rear axle housing 19, as indicated by arrows 29 in FIG. 2 after transferring the force through pivot point 24 and mount 21 at the midspan of the first and second transfer arm portions 22, 230. Also as seen in FIG. 2, the pivot point 24 of engine mount 21 is above the centerline of the engine 12.

Although variations may occur to an artisan, the scope of the invention should only be limited by the scope of the appended claims.

I claim:

1. In a vehicle having a chassis, an engine mounted on said chassis, a wheeled front axle and a wheeled rear axle mounted on said chassis forward and rearward of said engine respectively, the improvement which comprises;

rear axle control means fixedly coupled at one end to said engine and at the other end to said rear axle for equalizing rear tire traction and control vibrations of said vehicle when said engine is accelerated, said rear axle control means comprising a transfer arm having a first transfer arm portion fixedly secured at one end to said engine, and a second transfer arm portion fixedly secured at the other end to the top of said rear axle, said arm portions being pivotally connected at a pivot point to said chassis between their respective points of connection to said engine and said rear axle, and pivotally movable with respect to each other.

2. In a vehicle having a chassis, an engine mounted on said chassis, a wheeled front axle and a wheeled rear axle mounted on said chassis forward and rearward of said engine respectively, the improvement which comprises;

rear axle control means fixedly coupled at one end to said engine and at the other end to said rear axle for equalizing rear tire traction and control vibrations of said vehicle when said engine is acceleerated, said rear axle control means comprising a transfer arm fixedly secured at one end to said engine, and fixedly secured at the other end to the top of said rear axle, said arm being pivotally connected to said chassis between its points of connection to said engine and said rear axle, said arm being pivotally connected to said chassis about midway between the points of connection to said engine and said rear axle, and said arm including a first linear portion coupled to said engine extending to an angled portion integral with said first linear portion coupled to said rear axle.

3. In the vehicle of claim 2 wherein said arm is pivotally connected to said linear portion.

4. In the vehicle of claim 2 wherein said portion is at an angle of about 35° with respect to said angled portion.

5. In the vehicle of claim 2 wherein said arm is comprised of a plurality of layers of steel.

6. In the vehicle of claim 2 wherein said arm is connected to the left rear of said engine.

7. In the vehicle of claim 2 wherein said arm is connected to the left rear of said rear axle.

8. In the vehicle of claim 2 wherein said arm is connected to said engine by a mounting plate and said arm is connected to an axle mount coupled to a rear axle housing mounted on said rear axle.

9. In the vehicle of claim 2 wherein said arm is pivotally connected to an elongated flange mounted to said chassis.

10. In a vehicle having a chassis, an engine mounted on said chassis, a wheeled front axle and a wheeled rear axle mounted on said chassis forward and rearward of said engine respectively, the improvement which comprises;

rear axle control means fixedly coupled at one end to said engine and at the other end to said rear axle for equalizing rear tire traction and control vibrations of said vehicle when said engine is accelerated, said rear axle control means comprising a transfer arm having a first portion coupled at one end to the rear left of said engine and a second portion coupled at the other end to the top of the left side of said rear axle and pivotally connected, said first and second portions being pivotally connected to each other and to said chassis generally midway between said engine and said rear axle whereby, when said engine is accelerated, an upward force is created on said arm at its point of connection to said engine which changes to a downward force acting on the point of connection to said rear axle after transferring the force through said pivotal connection.

11. In a vehicle having a chassis, an engine mounted on said chassis, a wheeled front axle and a wheeled rear axle mounted on said chassis forward and rearward of said engine respectively, the improvement which comprises;

rear axle control means fixedly coupled at one end to said engine and at the other end to said rear axle for equalizing rear tire traction and control vibrations of said vehicle when said engine is accelerated, said rear axle control means comprising a transfer m coupled at one end to the rear left of said engine and at the other end to the top of the left side of said rear axle and pivotally connected to said chassis generally midway between said engine and said rear axle whereby, when said engine is accelerated, an upward force is created on said arm at its point of connection to said engine which changes to a downward force acting on the point of connection to said rear axle after transferring the force through said pivotal connection; said rear axle control means including said arm angling away from the pivot point to said rear axle.

* * * * *